May 15, 1962   B. WINGBERMÜHLE ETAL   3,034,368
APPARATUS FOR THE AUTOMATIC CONTROL
OF THE OUTPUT OF POWER SUPPLY
Filed Aug. 13, 1959   5 Sheets-Sheet 2
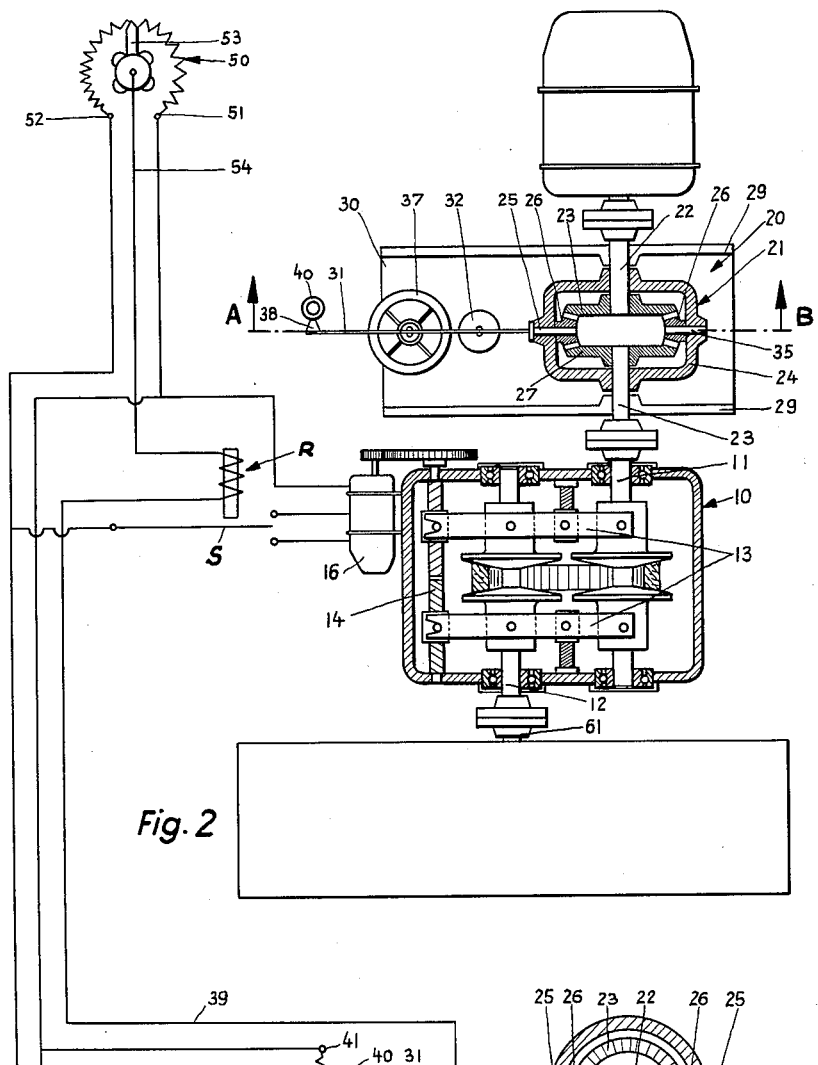
Fig. 2
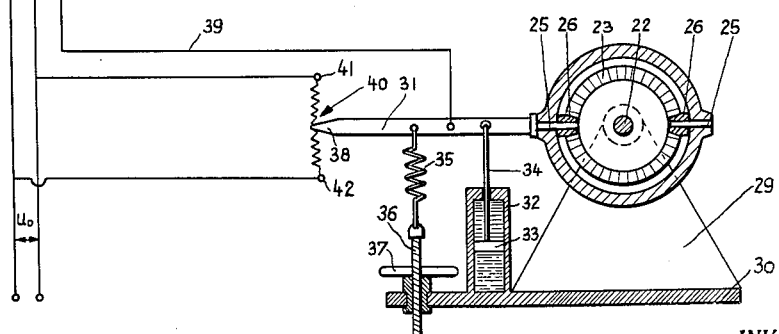
INVENTOR.
ERNST ZINDEL and BERTHOLD WINGBERMÜHLE
BY
Bailey, Stephens & Huettig
ATTORNEYS INVENTOR.
ERNST ZINDEL AND BERTHOLD WINGBERMÜHLE
BY
Bailey, Stephens & Huettig
ATTORNEYS

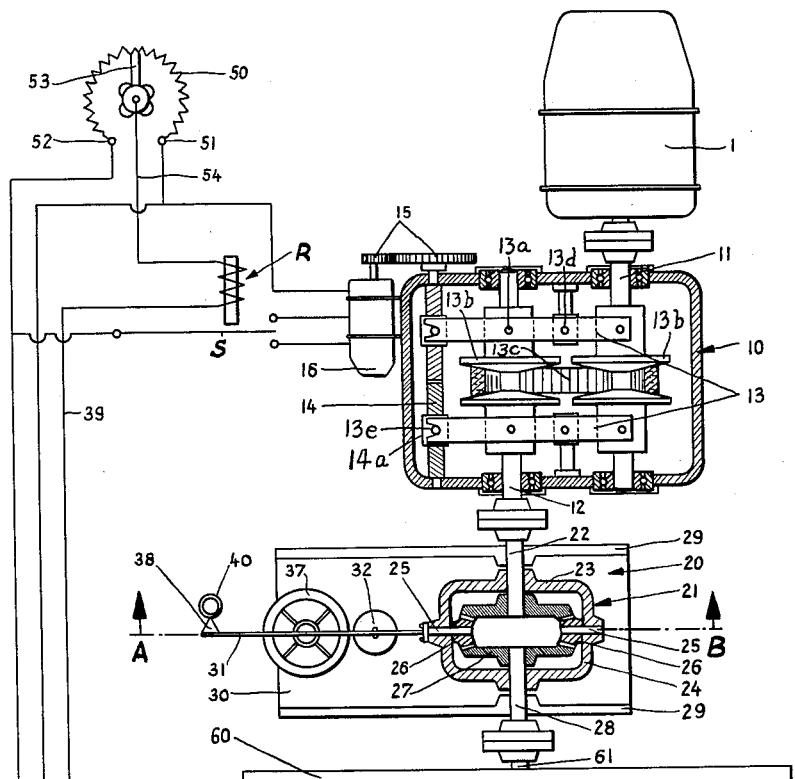
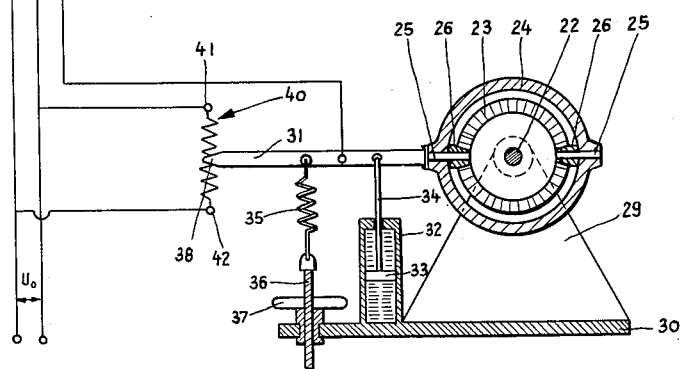
Fig. 1

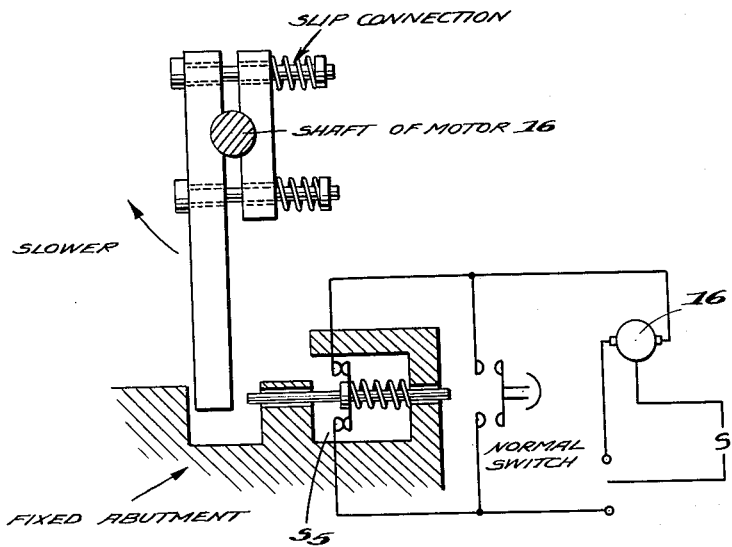

United States Patent Office 3,034,368
Patented May 15, 1962

3,034,368
APPARATUS FOR THE AUTOMATIC CONTROL OF THE OUTPUT OF POWER SUPPLY
Berthold Wingbermühle and Ernst Zindel, Bad Homburg vor der Höhe, Germany, assignors to Firma Reimers-Getriebe K.G., Ascona, Switzerland
Filed Aug. 13, 1959, Ser. No. 833,457
Claims priority, application Germany Aug. 16, 1958
8 Claims. (Cl. 74—230.17)

The invention relates to an arrangement for the automatic control of the output of a motor, and especially the driving torque, to maintain the torque at a desired value during varying speeds of rotation of at least one driving part of a machine driven by the motor in dependence on a theoretical value which is adjustable or which varies in a predetermined cycle.

Such arrangements have a very broad field of use. The following are certain possible uses, it being realized that the enumeration is incomplete.

One use is in so-called multiple shaft drives. In these, a machine for one reason or another is driven through several simultaneously operating drive members, the driving power being generally divided equally among the different driving members. The driving members can supply driving power only at the same (or at least proportional) speeds of rotation. Therefore the driving torque on the different parts of the multiple driven machine always correspond to the division of the load. With regard to the speed of rotation and torque, the driving member must be regulated by a control motor.

In the case of several machines arranged in series, but individually driven, for operating on strands or webs, which pass through the different machines and thus couple them with each other, the speeds of operation of the separate serially arranged machines must correspond with each other, since the goods passing through these machines either has the same speed in all the machines or else, for producing a predetermined stretching or contraction through the cooperation of the successive machines, has a graduated speed. In general it is necessary that a controlled, usually constant, travel of the goods through the machines be achieved. Therefore the driving speeds as well as the driving torques of the successive separate machines must correspond very exactly with each other.

The same problem occurs with multiple shaft drives for belt conveyors, circular conveyors and the like. In this case the endless belt or endless chain is driven at several points, so that the driving forces required for the movement of the conveyor can be kept small. Here also the conveyor must be driven with equal (or proportional) driving speeds, and for the purpose of uniform loading the motor and the various parts of the conveyor must be driven with corresponding driving torques.

Another use, very important in practice, is in reel drives for the winding up or unwinding of strands or webs, in which it is assumed that the lineal speed of the strand or web being wound on or unwound from a drum remains constant at a value determined by the machine. Also in this case generally during the winding or unwinding an essentially constant tension on the goods being wound or unwound is necessary. Because of the changes in winding diameter during the winding or unwinding to keep the lineal speed of the goods constant as well as the tension on the goods being wound or unwound, the driving speed and driving torque on the winding or unwinding drum must be inversely proportional to each other. In the case where, during the winding, changing tension, for example decreasing with the winding diameter, is desired, the power and correspondingly the torque on the driving shaft of an infinitely variable transmission must be variable according to a fixed cycle in dependence on the desired changes in tension at constant speed.

Another use is in stirring machines, in which it is more economical to operate at constant power. The torsion required for operation increases sharply with the stirring speed and is furthermore dependent on the viscosity of the material being stirred. The driving torque should not exceed a predetermined value, if during the stirring operation viscosity changes occur in the substance being stirred, which are reflected by changes in the stirring speed and thereby in the driving torque.

All the foregoing examples have the common characteristics that, with individual drives, a change of the driving speed results directly in a change in the driving torque of the machine, while, with multiple shaft drives, any change in the driving speed of one of the separate drives produces a large variation of the prevailing (usually equal) division of the whole driving torque requirements of the machine among the individual driving members.

For adaptation to different conditions, the driving torque must be adjustable at will to different theoretical values. It is likewise necessary that, upon disturbances in operation, the theoretical value of the torque must remain constant, which, because of the direct connection between the driving speed and the driving torque, can be attained by a change in the driving speed. The theoretical value need not remain absolutely constant. Often it is required that this theoretical value vary in a predetermined cycle during a working period, especially in the case of periodically repeated operations.

The primary purpose of the present invention is to provide an arrangement which is capable of fulfilling the requirements set forth above.

Another object of the invention is to provide a mechanism for solving these problems which is not useful merely for one purpose and designed for that purpose only, but is generally applicable so that the construction in principle is available for all uses to which it may be put. This makes it possible to construct the device as a separate part for a wide variety of uses and to attach it as a standard mechanism to different machines. Furthermore the mechanism according to the invention provides the possibility of accomplishing in a simple manner the setting of the theoretical value and even regular changes in the setting of the theoretical value to meet different requirements, the purpose of which is to make it unnecessary to embody the arrangement in the special constructive characteristics of the machine to be controlled.

For the foregoing problem, in individual cases solutions are already known for automatically controlling the value of the driving torque, which however must always be designed for some particular use and usually operate with a very poor efficiency of the motor, for instance by the use of friction clutches. Also these special solutions cannot be used for other similar purposes, because the addition of the mechanism must be considered with relation to the individual structural characteristics in connection with the complete structure.

Through the device according to the invention these known disadvantages are avoided and an arrangement for the automatic control of the motor output or driving torque, to maintain the torque at a desired value during varying speeds of rotation of at least one driving part of a machine driven by the motor in dependence on a theoretical value which is adjustable or which varies in a predetermined cycle is provided, which basically is usable for different purposes, so that only the driving requirements for each case and the required range of changes in torque and speed need be considered. In addition, these arrangements are simple in their servicing and care, and are adaptable to operate with good efficiency for different purposes.

The purposes of the invention are accomplished by a construction in which, between the motor part and the drive shaft of the machine, an arrangement for the infinite variation of the speed of the motor part and a torque measuring device are connected; the torque measuring device is connected with a measuring instrument for transforming the measured actual value of the torque into a corresponding electrical voltage value; this actual voltage value and a theoretical voltage value, which represents the theoretical value of the torque and is produced by a theoretical value emitter, are compared with each other in a known manner, whereby the differential voltage produced by a divergence of the control, if necessary after being amplified, sets in action a movable part which produces shifting of the arrangement for the infinite variation of the speed of the motor in a direction to overcome this divergence.

As driving motors, constant speed electric motors can be used. However, internal combustion engines can also be used, as well as engines with counter shafts operating at the same speed. In exceptional cases, for example in reeling devices or in serially arranged separate machines, which are coupled by goods running through them, a common counter shaft is often used as the driving member, which can be driven at different speeds for the changing of the operating speed of the whole assembly.

It has also been found advantageous to use, as the arrangement for the infinite variation of the speed of the driving member, a known mechanical or hydraulic infinitely variable drive as the regulating part of the device, whose shifting or control motor serves to produce changes in the transmission ratio; and to use as the torque measuring device a differential, which can be a spur-gear, planet-gear drive or a bevel gear differential, and in which the movement of the planet-gear carrier (in a bevel gear differential), with the interposition of a damping arrangement, is resisted by a resilient force the initial value of which is adjustable and which serves as a standard for the active torque; the carrier or ring gear, resisted by the measuring spring, is connected with a slider of a potentiometer connected as a voltage divider, the ends of the winding of the potentiometer being furnished with a constant input voltage, so that between one end of the winding and the slider a partial voltage corresponding to the measured torque can be obtained.

Within the scope of the invention, the device for furnishing the theoretical value can also be a potentiometer connected as a voltage divider, whose winding is supplied with a feed voltage the value of which, for the purpose of regular changes of the theoretical voltage value on the displaceable slider which is settable as desired, can be varied, preferably by the connection of a correction voltage divider, whose slider is shiftable in a predetermined cycle corresponding to the desired variations in feed voltage.

The various parts of the arrangement according to the invention and their functional cooperation provide a device suitable for the purposes discussed which is composed of readily available sturdy parts, is economical in construction, requires little care, is easy to repair and very simply adaptable to different uses. The mechanism operates under all operating conditions with high efficiency and has a long life.

Of course the scope of the foregoing invention is not avoided if the individual arrangements described as specially advantageous are replaced by equivalent devices. Thus it is naturally possible to use, instead of a differential, any other suitable torque measuring device, for example a torsion bar, whose twist angle can be measured in known manner. The measured value must of course be amplified and converted into a voltage corresponding to the measured torque. Also, the housing support moment of the infinitely variable drive or of an intermediate drive of fixed transmission ratio can be used for determination of the torque, for example by attaching it through a pressure measuring cell which takes up the housing support moment. Also in this case, with amplification of the measurement value obtained, a conversion of the measured value into a voltage corresponding to the measured torque is necessary. In special cases the driving part and the arrangement for infinite speed variation can be combined and can be constructed as an infinitely controllable electric motor, a regulatable internal combustion engine or the like, so that the regulating part of the control device operates in the sense of a change of the motor speed of such a combination.

Similarly, the driving part and the torque measuring device can be combined and can, for example, be constructed as a constant speed electric motor with an oscillating suspended stator, with which an infinitely variable drive is connected. In extreme cases, the driving part, the arrangement for infinite speed variation and the torque measuring device may be combined in a single structure and be composed of an infinitely variable speed electric motor with an oscillating suspended stator. This involves only a choice by a skilled artisan from the technical equivalents available; it must be noted, however, that these technical equivalents can create some problems in contrast to the preferred mechanisms, and should only be used in special situations.

If an infinitely variable transmission is connected between the driving motor and the driven machine, the driving torque on the machine is kept substantially constant if the torque measuring device is connected between the infinitely variable transmission and the drive shaft of the machine; whereas a variable driving torque substantially inversely proportional to the speed of the machine, that is, a constant power output for the machine, can be maintained if the torque measuring device is connected between the driving motor and the infinitely variable transmission. In both cases it is assumed that torque measured by the torque measuring device is to be kept at all times at a constant theoretical value through the automatic regulator composed of the measurement emitter, the theoretical measurement emitter, the amplifier and the control part. If however the theoretical value is to be changed in a regular cycle, then of course there is a corresponding regular change in the torque exerted by the motor on the driven machine, which besides is always coupled with the driving speed of the machine.

In a multiple drive for a machine, it has been found advantageous to use one of the driven members as a controlling part, so that the transmission ratio of the infinitely variable transmission coordinated with it is selectable as desired. The other drive parts are then constructed as follow-up drives, and especially in such a way that the torsion measured by the torsion measuring device of the control part, which is converted into a voltage of corresponding value by the measurement emitter, is used as a theoretical value for all the remaining follow-up drives. Thereby the follow-up motors as a group are regulated by the driving torque of the driven machine which is supplied by the control part, so that an equal division of the load on all the drives is obtained, which, with the more or less rigid connection between the driving torque and driving speed, is only possible if also the follow-up motors feed their output each with its own proper speed to the driven machine.

Especially in winding and unwinding machines it has proven desirable, in order to give any desired regular cycle of changes of the selectively settable theoretical value, to make the correction voltage divider connected with the theoretical value transmitter adjustable in dependence on the transmission ratio changes of the infinitely variable transmission.

In winding and unwinding devices, the transmission ratio of the infinitely variable transmission connected after the torque measuring device in the normal course of a winding operation changes constantly in one sense, for example in winding goods in the sense that the drum is always driven more slowly corresponding to its increasing diameter, so that for maintaining a constant tension on the strip the driving torque of the drum changes in inverse proportion to the speed, which, apart from loss of efficiency in the infinitely variable transmission, corresponds to a constant torque on the motor side of the infinitely variable transmission. If the strip breaks, the driving torque of the drum suddenly decreases very rapidly, so that the control arrangement responds with an increase in the driving speed, as well as with a change of the ratio of the infinitely variable transmission in a sense opposite to normal. It has been found that this undesired behavior of the control device can be counteracted by connecting a pull switch to the control motor for the infinitely variable transmission which puts the motor out of action as soon as a control differential opposed to the increasing operating condition occurs or when it exceeds a given value. Such a pull switch, which puts the regulating device out of action, can also be used with advantage in multiple drive machines, in which a group of machines connected in series are driven, which are coupled by a web or strand running through them. In the event of a break between two successive machines, there is an undesirable increase in the speed of the machine in advance of the break. In this case the pull switch is so arranged as to cut off the control motor as soon as the control differential on the two sides of the break exceeds a given amount.

In periodically repeated operations, such as winding and unwinding, at the end of each operation the mechanism must again be put into condition for the beginning of the next operation. In winding arrangements this means that the drum which is turning very slowly at the end of the winding must again be brought to a high speed which is necessary for the beginning of the unwinding. For this purpose, in a modification of the invention, in addition to the measurement value emitter, the theoretical value emitter, the correction voltage divider (and if necessary the pull switch), the amplifier and control element which compose the regulating device, a further theoretical value emitter for the return of the transmission ratio of the infinitely variable transmission to an initial value after the end of the operation is provided, as well as a multi-pole switch, by which the theoretical value and actual value emitters for the torque are put out of operation, and the correction current divider which is adjustable in accordance with the transmission ratio of the variable speed transmission, acting as the actual value emitter for the transmission of the power, can be connected with the addition theoretical value emitter to form a control circuit. In this case the transmission ratio of the infinitely variable transmission is independent of the torque acting on the winding drum in order to restore the transmission ratio to the proper value for the beginning of the operation.

Further objects and advantages of the invention will appear more fully from the following description especially when taken in conjunction with the accompanying drawings, which form a part thereof.

In the drawings:

FIG. 1 shows an arrangement for the setting and maintaining of a constant driving torque on a machine;

FIG. 2 shows an arrangement for a predetermined constant motor output, with a driving torque on the machine which is inversely proportional to its speed;

FIG. 5 shows an automatic switching means for a control motor of this device.

Insofar as the parts are the same in the different figures, the same reference characters are used.

Figure 3:
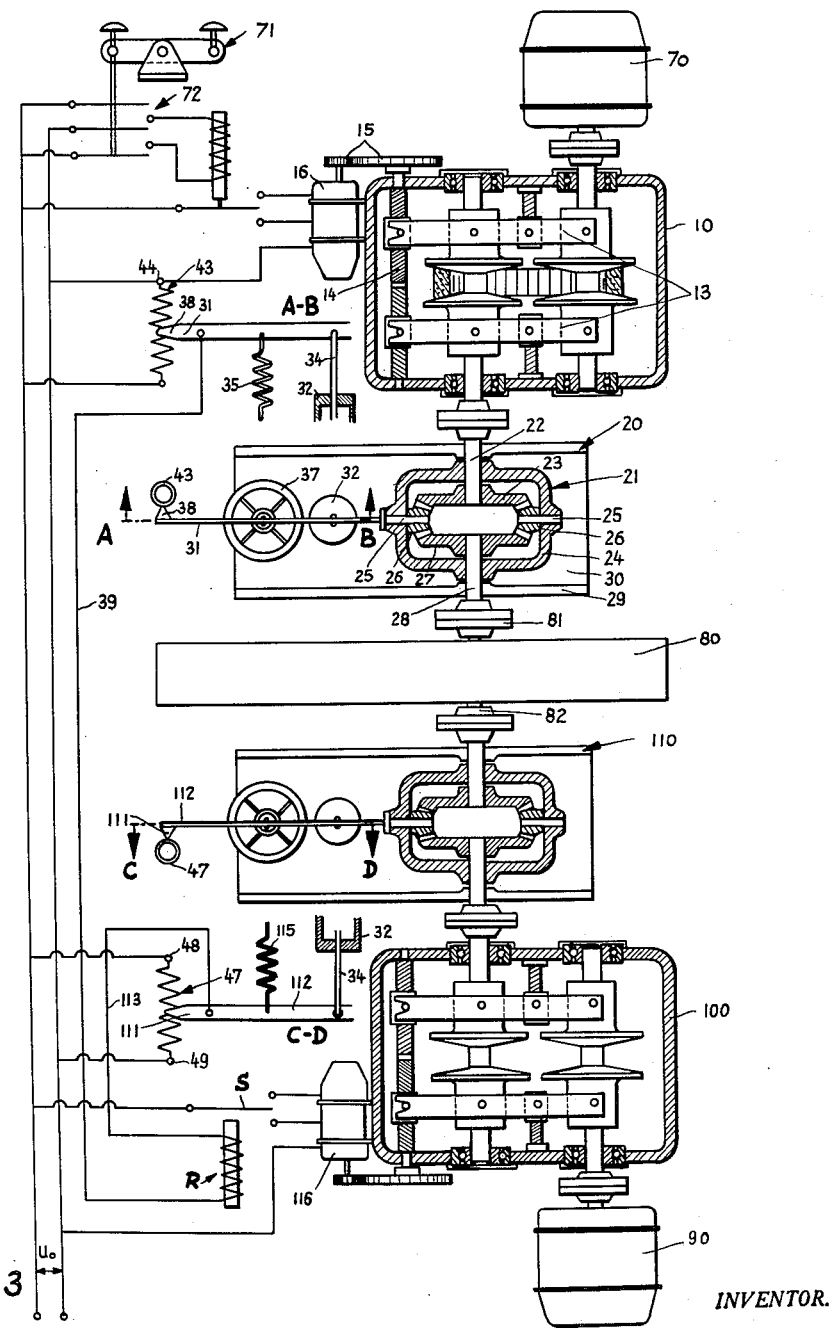
FIG. 3 shows an arrangement for driving a machine through a control drive with adjustable driving speed for the machine and through a follow-up drive which maintains the driving speed and the driving torque at the same value as the control drive.

In FIG. 1, 1 is the driving motor, which may be a constant speed electric motor, but this can be replaced by a counter shaft. The motor 1 is coupled with an infinitely variable transmission 10 of known construction and drives its input shaft 11 at constant speed.

The output shaft 12 of the infinitely variable transmission is infinitely variable in its speed of rotation by the operation of control levers 13 which are pivoted at 13a to opposed conical members 13b which are slidable on the shafts 11 and 12 and are connected by a belt 13c. Levers 13 are pivoted on adjustably fixed pivots 13d and are pivoted at 13e to nuts 14a threaded on a double threaded spindle 14. Spindle 14 is driven by a pair of toothed gears 15 from a control motor 16 which can turn in either direction. In general the described infinitely variable transmission can be replaced by any other suitable infinitely variable transmission, in which the control arrangement is adjustable for changing the transmission ratio by means of a control motor such as 16.

A torque measuring arrangement 20 is coupled with the output shaft 12 of the infinitely variable transmission. This consists, in the arangement shown, of a differential drive 21 which has its input shaft 22 rigidly coupled with the output shaft 12 of the infinitely variable transmission; this shaft carries a sun gear 23 constituted by a bevel gear. Two or more planet gears 26, in the form of bevel gears, mesh with the sun gear 23 and are freely turnable on fixed axes 25 mounted in a housing 24. A second sun gear constituted by a bevel gear is in mesh with the planet gears 26 and is fixed on the output shaft 28 of the differential drive. Housing 24 is turnable on shafts 22, 28. Instead of the bevel gear differential described it may in some cases be more advantageous to use a spur gear-planet gear drive.

The input shaft 22 and the output shaft 28 of the differential extend through the housing and are turnably mounted in a bearing stand 29 of a fixed plate 30. A radial lever arm 31 is rigidly connected with the housing 24 of the differential drive, and to it is pivotally linked by a piston rod 34 a piston 33 movable in a damping cylinder 32. Also a spring 35 is connected to the lever arm 31, which by means of an adjusting threaded spindle 36 and a hand wheel 37 can be given any desired tension. The characteristic of the spring 35 may, for example, be linear, but also in some cases may be non-linear. The end 38 of the lever arm 31 serves as a slider of a potentiometer 40 connected as a voltage divider, the winding ends 41 and 42 of which are supplied with a constant voltage $U_0$. This voltage divider 40 serves as a measuring value emitter. The winding ends 51 and 52 of another potentiometer 50 connected as a voltage divider likewise are furnished with a constant voltage $U_0$. The slider 53 of this potentiometer 50 is settable by hand to any desired value. The potentiometer 50 serves for setting theoretical values.

The partial voltages derived between the winding ends 52 or 42 of the two potentiometers 50 and 40 and the sliders 53 or 38 corresponding to the particular positions of the sliders of both voltage dividers are fed through the wires 54 and 39 connected to the sliders 53 and 38 to a relay R, which in response to a difference between the derived voltages and in accordance with the sign of this difference operates a switch S in one direction or the other, through which the control motor 16 of the infinitely variable transmission is connected to be driven in one direction or the other. Of course, it is also possible for the relay R to operate a change relay, which switches on the control motor in one direction or the other. It is only to avoid confusion in the drawing that such a relay is omitted. Likewise, in normal operation the control current and the driving current of the regulating motor would be separate.

A machine to be driven or a load is directly coupled by its input shaft 61 with output shaft 28 of the torque measuring device.

With the above arrangement, the driving torque on the drive shaft 61 of the machine 60 should remain constant; but in fact through this arrangement, with the help of the infinitely variable transmission 10, the driving speed of the shaft 61 changes upon any variation of the theoretical torque until the theoretical torque is again reached. The arrangement operates as follows:

It is assumed that the machine 60 is being driven from the motor 1 through the infinitely variable transmission 10 and the differential drive 21 with a selected driving speed and has at this speed a predetermined driving torque requirement. This drive torque on the shaft 61, which is derived from the infinitely variable transmission 10 through the differential drive 21, produces on the carrier for the planet gear 26, which is constituted by the housing 24, a turning moment which tends to move the housing 24 and therewith the lever arm 31 against the tension of the spring 35 which is connected to the lever arm. The spring 35 is so adjusted in its tension that it just balances this moment on the housing. The end of the lever arm 31 serving as a slider then has on the winding of the potentiometer 40, connected as a voltage divider a predetermined position. Correspondingly, a predetermined voltage is tapped off through the slider 38 of this voltage divider which serves as a measurement value emitter.

It is further assumed that the slide 53 of the potentiometer 50 connected as a voltage divider and which serves as a theoretical value emitter is so set that the theoretical value emitter 50 taps off a partial voltage of the same value as the emitter 40. Since both these partial voltages are conducted to the relay R and there the partial voltage from the measuring value emitter 40 is balanced, differential relay R is subjected to no voltage difference, so that the switch S remains in its inoperative position. The control circuit is then in balance.

This balance can be disturbed in two ways, either through changing the setting of the slider 53 of the theoretical value emitter 50 or through a change of the torque requirement of the machine 60.

If by means of the slider 53 of the theoretical value emitter 50 a different theoretical value is set, then there is produced by the two partial voltages derived from the theoretical value emitter 50 and the measuring value emitter 40 a differential voltage, which shifts the switch S and thereby switches on the control motor of the infinitely variable transmission 10 in one direction or the other. As a consequence, the double threaded spindle 14 is turned by the gears 15, so that in a known way the ratio of the infinitely variable transmission 10 changes. Correspondingly now also the machine 60 will be driven with a changed speed of shaft 61. With this changed speed the machine also has a changed driving torque requirement, so that also the turning moment on the housing of the differential drive 21 which serves as the torque measuring arrangement is changed. The housing 24 then turns until the strength of the spring 35 is such as to balance the housing moment. The slider 36 then shifts along the winding of the voltage divider 40, so that the partial voltage derived from this measuring value emitter changes. As soon as this partial voltage reaches the same value as the changed partial voltage derived from the theoretical value emitter 50, the switch S returns to its inoperative position and the balance of the control circuit is restored. The machine 60 now is driven at a changed speed with changed driving torque. The value of this driving torque is determined through the position of the tap 53 of the theoretical value emitter 50. It is clear any desired driving torque in the drive shaft 61 on the machine 60 can be set as desired. The driving speed then takes such a value that the driving torque requirement of the machine at this speed exactly corresponds to the driving torque value selected.

The second possibility of disturbing the existing balance in the control circuit comes from the fact that for some other reason the driving torque requirement of the machine 60 at the existing driving speed changes. In this case the driving motor furnishes immediately a driving torque which, for example, increases. The differential drive 21 of the torque measuring arrangement 20 is subjected then to a higher turning moment and the housing 24 turns, damped by the damping arrangement 32, 33, 34, until the strength of the spring 35 restores the balance. The slider 38 then changes its position on the voltage divider 40 and the partial voltage derived from this measuring value emitter now corresponds to the new driving torque on the driving shaft 61, but is now different from the partial voltage derived from the theoretical value emitter 50, so that a differential voltage exists in the relay R which operates the switch S. By this again the control motor 16 is switched on, which changes the ratio of the infinitely variable transmission 10 until the machine in consequence of this changed driving torque has only the driving torque requirement which it originally had. The driving torque on the shaft 61 is thus held constant, so that the driving torque is automatically regulated at any value, and the machine has the same driving torque requirement as originally.

If, for example, the machine 60 in the above described case is a stirring machine, then it is possible through the setting of the theoretical value emitter to set any desired speed by which a predetermined driving torque on the shaft 61 is maintained. It is also possible to calibrate the theoretical value emitter directly in units of measurement of the driving torque. If, for example, during the stirring operation the viscosity of the material being stirred increases, then the required drive torque increases for the original driving speed, and the arrangement automatically reduces the driving speed until the value of the driving torque originally set on the theoretical value emitter is reached.

The arrangement of FIG. 2 differs from that of FIG. 1 only in that the torque measuring device 20 is arranged between the drive motor 1 and the infinitely variable transmission 10, which in turn has its output shaft 12 directly coupled with the input shaft 61 of the machine 60. In this case the torque on the input shaft 11 of the infinitely variable transmission 10 remains constant. The value of this torque is adjustable by means of the theoretical value emitter 50. The constant torque on the input shaft 11 of the infinitely variable transmission which is driven at a constant speed serves to keep constant the power fed into the infinitely variable transmission. Ignoring the small differences of efficiency loss of the arrangement at different transmission ratios, then the power on the output shaft 12 of the infinitely variable transmission and consequently the input power of the machine 60 remains constant at all speeds of the shaft 61. By changing the position of the slider 53 of the theoretical value emitter 50, it is possible to adjust the driving power for the machine to any desired value, so that the driving speed of the shaft 61 assumes such a value that the product of this driving speed and the torque operating on the shaft is constant. A change in the driving torque requirement of the machine 60 causes, in the manner described in connection with FIG. 1, the control arrangement to produce a ratio change of the infinitely variable transmission so that in the foregoing case the turning torque and the speed of the shaft 51 change in inverse proportion to each other, so that their product, which corresponds to the power, always maintains the same value as that set by the theoretical value emitter 50. The theoretical value emitter 50 can in this case be directly calibrated in units of measurement of the driving power for the machine 60.

FIG. 3 shows a multiple shaft drive, in principle like that in FIG. 1, for a machine 80, which is supplied with power through two drive mechanisms. 70 is the driving motor of the main drive, 10 is an infinitely variable transmission directly coupled with it, 20 a torque measuring arrangement between the infinitely variable transmission 10 and the machine 60, 90 the drive motor of the follow-up drive, 100 the infinitely variable transmission directly coupled with motor 90 and 110 the torque measuring arrangement of the follow-up motor between the infinitely variable transmission 100 and the machine 80.

The ratio of the infinitely variable transmission 10 of the control motor is adjustable by means of the control motor 16, the toothed gears 15 and the doubly threaded spindle 14. For the switching on of the control motor 16 in one direction or the other there is provided a two-button switch 71, which is connected with a switch relay 72 in a known manner. In this way the driving speed of the machine 80 by the shaft 81 can be freely selected.

The driving torque exerted by this driving speed of the shaft 81 of the follow-up motor is measured by the torque measuring device 20 in the manner previously described and by means of the end of lever 31 serving as a slider 38 of the torque measuring arrangement and a potentiometer 43 connected as a voltage divider, the ends 44 and 45 of the winding of which are supplied with a constant feed voltage $U_0$, is converted into a partial voltage corresponding to the torque on the shaft 81. The potentiometer 43 in this case serves as a theoretical value emitter for the follow-up motor. The partial voltage derived from it is fed by wire 89 to a relay R. This relay R receives besides by the line 113 a partial voltage derived from a potentiometer 47 connected as a voltage divider which opposes the first mentioned partial voltage. The potentiometer 47, the winding ends 48 and 49 of which are likewise supplied with a constant feed voltage $U_0$, is in this case connected as a measuring value emitter of the torque measuring arrangement 110, which measures the driving torque of the follow-up drive 90, 100 on the second drive shaft 82 of the machine 80 and, in the manner previously described, by means of the end 111 of the lever arm 112 of the torque measuring device 110 which serves as a slider converts the torque acting on the shaft 82 into a corresponding partial voltage. As long as the driving speeds of the shafts 81 and 82 of the machine 80 agree exactly and also the driving torques on both these shafts are the same, the control circuit is in equilibrium. If, for example, the driving speed of the shaft 81 through operation of the switch 71 and the consequent change in transmission ratio of the infinitely variable transmission 10 increases, then the main drive 70, 10 assumes almost the whole driving power of the machine 80, so that the moment on the shaft 81 increases correspondingly. Through the torque measuring arrangement 20, a higher partial voltage is now derived from the theoretical voltage emitter 43, whereas simultaneously through the decrease of the driving torque on the shaft 82 the partial voltage derived from the measuring current emitter 47 is decreased. This produces on the relay R a differential voltage, through which switch S of the control motor 116 of the infinitely variable transmission is switched on in such a direction that it also increases the driving speed on the shaft 82 of the machine. As soon as this reaches the driving speed of the shaft 81, the follow-up drive 90, 100 again assumes one-half of the total required driving torque, so that the control circuit comes to rest in a new equilibrium condition. Through the setting of the resistances of potentiometers 43 and 47 and through the setting of the initial stress of the springs 35 and 115 acting on the lever arms 31 and 112, it is possible to divide up the whole required driving torque of the machine 80 in any desired manner between the drive shafts 81 and 82. This is of importance if the machine 80 is arranged in a series of connected machines, which are coupled together by a web or strand shaped member passing through the different machines. In this case, the shaft 81 is the drive shaft for one of the serially arranged machines and the shaft 82 for the next following machine. In such cases it is often desirable that the driving torques on the drive shafts 81 and 82 should be different from each other. Also in this case the follow-up motor is controlled by the torque required on the shaft 82, by which the torque on the shaft 82 is kept at a predetermined ratio to the torque on the shaft 81.

Of course, the main drive 70 may control not merely one follow-up drive but several such drives.

Figure 4:
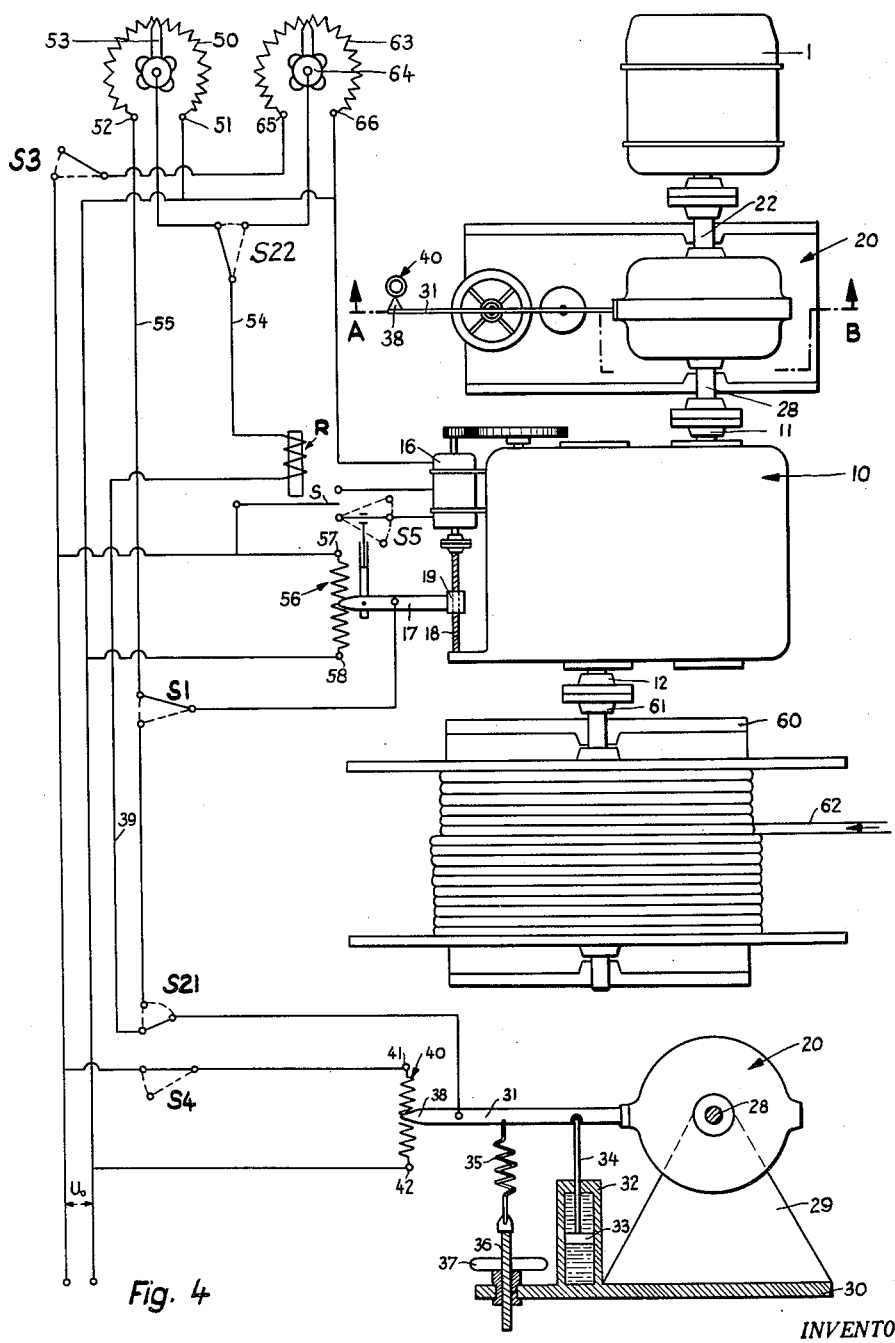
FIG. 4 shows a winding machine in which the tension on the web varies in a predetermined cycle.

FIG. 4 shows a winding or reeling arrangement, which generally corresponds to the arrangement of FIG. 2. The driving motor for the reeling arrangement has the torque measuring device coupled directly therewith, and 10 is the infinitely variable transmission which is connected between the torque measuring device 20 and the drive shaft 61 of the winding drum 60. Transmission 10 is also adjustable in its ratio by means of a control motor 16. The control motor 16 can be switched in one direction or the other by means of a switch S controlled by a relay R. The end 38 of the lever arm 31 again works in the previously described manner as the slider of a potentiometer 40 connected as a voltage divider, the winding ends 41 and 42 of which are supplied with a constant feed voltage $U_0$. The derived partial voltage, which corresponds with the torque on the input shaft 11 of the infinitely variable transmission, is conducted by a line 39 to the relay R. There is furthermore a potentiometer 50 connected as a voltage divider which acts as a theoretical value emitter, the slider 53 of which is adjustable as desired to any predetermined value, for instance by hand, so that a partial voltage is likewise derived from the voltage divider 50, which is conducted by line 54 to the relay and there opposes the partial voltage derived from the voltage divider 40. But the winding ends 51 and 52 of voltage divider 50 serving as a theoretical value emitter are in this case furnished with a variable feed voltage by the line 55. This variable feed voltage is derived as a partial voltage from the potentiometer 56 connected as a voltage divider, the winding ends 57 and 58 of which are supplied with a constant feed voltage $U_0$. The derivation of the partial voltage serving as the feed voltage for the theoretical value emitter 50 is achieved by a slider 17. This is pivotally connected to a traveling nut 19 threaded on a spindle 18 rigidly connected with the shaft of the control motor 16. If the control motor is switched on in one direction or the other, then the slider 17 moves on the voltage divider 56 whereas simultaneously the transmission ratio of the infinitely variable transmission is changing. The value of the partial current derived from the correction voltage divider 56 is then directly dependent on the particular transmission ratio of the infinitely variable transmission.

The arrangement of FIG. 4 as described up to this point operates as follows:

At the beginning of the winding operation the driving torque of the winding drum 60 has a value which corresponds to the radius of the drum and the constant running speed of the material 62 which is being wound. By setting the slider 53 of the theoretical value emitter, it is possible to adjust the driving torque and thereby the pull on the material 62 to any desired values at this speed of the winding shaft 61. Because with increasing winding radius the required torque for maintaining a constant pull on the material increases proportionally but simultaneously the driving torque of the winding drum must decrease in inverse proportion to its changing winding radius, it is necessary to drive the winding drum 60 at all speeds with a constant power. Because to this extent the arrangement according to FIG. 4 corresponds completely with that of FIG. 2, the infinitely variable transmission 10 is so changed in its transmission ratio through the operation of the control motor 16 that the driving torque of the winding drum 60 is adjusted for each winding diameter and that the torque operating on the winding shaft 61 always remains inversely proportional to the driving speed, which corresponds to a constant driving power, that is a constant torque on the input shaft 11 of the infinitely variable transmission 10. Through the setting of the infinitely variable transmission by the control motor 16, the partial voltage supplied to the theoretical value emitter 50 as a feed voltage is changed also through the slider 17. There results a regular change of the partial voltage derived from the theoretical value emitter 50 despite an unchanged setting of the slider 53. In this way it is possible to change the torque on the input shaft 11 of the infinitely variable transmission regularly during the course of the winding operation. In this way the pull on the material being wound also changes regularly with the changing winding radius, for example, in the sense of a decrease of the pull with increasing winding radius.

If during the winding operation the material 62 breaks, then the torque on the winding drum 60 drops suddenly almost to zero, to which condition the arrangement responds immediately with a substantial increase of the winding drum speed. But this is of course undesirable, because the heavy winding drum would thereby be brought to inadmissibly high speeds and besides the infinitely variable transmission would be so sharply changed in its transmission ratio that after correction of the break a further winding of the material on the already partly filled winding drum would be impossible because the speed of the winding drum would no longer correspond with that of the material. In order to make this undesirable operation impossible, a pull switch S5 is coupled with the control motor 16, which cuts off the control motor as soon as it is switched on by the switch S in a direction which is opposite to the direction of the control motor during the immediately preceding winding operation. The pull switch S5 can of course be so constructed that it first cuts off the control motor 16 when this acquires a predetermined speed of rotation in the sense of increasing the drum speed. This type of switch is known and therefore the pull switch S5 is only diagrammatically shown; it is advantageously so arranged that it can be rendered inoperative if so desired.

At the end of the winding operation the fully wound winding drum is replaced by an empty drum and the winding operation is repeated as described. But for this purpose the winding drum shaft must again be brought back to its maximum speed, so that the peripheral speed of the empty winding drum agrees with the lineal speed of the material being unwound. For this purpose FIG. 4 shows a winding arrangement with a restoring regulator device. This includes a further potentiometer 63 connected as a voltage divider and a multipole switch S1, S21, S22, S3, S4. The additional potentiometer includes an adjustable slider 64, and its winding ends 65 and 66 can be supplied through the switch S3 with a constant feed voltage $U_1$. By operation of the multipole switch the following switching operations are simultaneously carried out:

By the switches S1 and S21, the partial voltage derived from the correction voltage divider 56 is cut off from the theoretical value emitter 50 and fed to the relay R. Simultaneously the partial voltage imposed on the theoretical value emitter 50 and fed to the relay R is cut off and thereby the partial voltage derived from the additional theoretical value emitter 53 is fed to the relay. The switch S3 connects the winding ends 55 and 56 of the additional voltage divider 63 to the voltage $U_0$, and the switch S4 cuts off the voltage $U_0$ from the winding ends 41 and 42 and the measuring value emitter. The differential voltage existing on the relay, which is the difference between the partial voltage taken off from the theoretical value emitter 63 and the partial voltage taken off from the correction voltage divider 56, results in a switching on of the control motor 16 by the switch S in the direction to increase the driving speed of the winding drum 61. Because with the variation of the infinitely variable transmission the setting of the slider 17 of the correction voltage divider also changes, the differential voltage finally, at a predetermined transmission ratio of the infinitely variable transmission and therefore at a predetermined speed of the winding drum, is reduced to zero and the control motor 15 is switched off. The speed at which this occurs is determined by the setting of the slider 64 on the additional voltage divider 63. It is thus possible to bring the speed of the winding drum shaft exactly to any desired value, which is necessary for the beginning of a new winding operation.

The described arrangement can also of course be used for the unwinding of a web from a wound drum. Then, however, the winding motor is constructed as a braking generator, because now the winding drum is driven by the material being drawn from the machine.

While we have described herein some embodiments of our invention, we wish it to be understood that we do not intend to limit ourselves thereby except within the scope of the claims hereto or hereinafter appended.

We claim:

1. Apparatus for the automatic control of the output of a power supply to a machine to be driven, comprising a driving connection between the power supply and the machine, said driving connection including an infinitely variable transmission and a torque measuring device, means operatively connected to said torque measuring device to provide a first actual-measurement voltage corresponding to the torque in the driving means, means to provide a second voltage corresponding to a theoretical torque value, means connected to the infinitely variable transmission to vary the transmission ratio thereof, means to compare said first and second voltages, and means operatively connected to said comparing means and said transmission ratio varying means and operable by a difference in said voltages to vary the transmission ratio so as to maintain the torque in said driving connection at said theoretical value, said transmission ratio varying means comprising a control motor operatively connected to said transmission, said torque measuring device including a differential drive having a movable part carrying planet gears, and an arm connected with said movable part, resilient means connected to said arm resisting turning thereof in one direction, said first voltage supplying means comprising a first voltage dividing potentiometer having a slider carried by said arm, said second voltage providing means comprising a second voltage dividing potentiometer having a slider, and said comparing means comprising a relay connected to said motor to control the same.

2. Apparatus as claimed in claim 1 including means to supply a third voltage to said second slider, and means controlled by operation of the apparatus to vary said third voltage.

3. Apparatus as claimed in claim 2 in which the torque measuring device is connected between the infinitely variable transmission and the machine.

4. Apparatus for the automatic control of the output of a power supply to a machine to be driven, said machine including a plurality of shafts, comprising driving connections from said power supply to said shafts, each of said driving connections including an infinitely variable transmission, and including a master driving connection having a torque measuring device therein, means operatively connected to said torque measuring device to provide a first actual-measurement voltage corresponding to the torque in the driving means, means to provide a second voltage corresponding to a theoretical torque value, means connected to the infinitely variable transmissions to vary the transmission ratios thereof, means to compare said first and second voltages, and means operatively connected to said comparing means and operable by a difference in said voltages to vary the transmission ratios so as to maintain the torque in said driving connections at a predetermined value, said transmission ratio varying means comprising control motors one operatively connected to each of said transmissions, said torque measuring device including a differential drive having a movable part carrying planet gears, and an arm connected with said movable part, resilient means connected to said arm resisting turning thereof in one direction, said first voltage supplying means comprising a first voltage dividing potentiometer having a slider carried by said arm, means to supply a third voltage to said second slider, and means controlled by operation of the transmission ratio varying means to vary said third voltage, and said comparing means comprising relays connected to said motors to control the same.

5. Apparatus as claimed in claim 1 for winding and unwinding in which said torque measuring device is connected between the power supply and the infinitely variable transmission.

6. Apparatus as claimed in claim 2, in which said third voltage supply means comprises a third voltage dividing potentiometer having a slider operatively connected with said control motor for movement thereby, a fourth voltage supply means comprising a voltage dividing potentiometer having a slider and multipole switch means for simultaneously disconnecting said first and second voltage supply means from said comparing means and for connecting the sliders of said third and fourth voltage supply means thereto, whereby to change quickly the transmission ratio at the end of one phase of operation.

7. Apparatus as claimed in claim 6 having pull switch means connected with the slider of the third voltage supply means to disconnect the control motor when the controlling action thereon is suddenly varied.

8. In apparatus as claimed in claim 1, means to supply a third voltage to said second slider, and means controlled by operation of the transmission ratio varying means to vary said third voltage.

References Cited in the file of this patent

UNITED STATES PATENTS

| | | |
|---|---|---|
| 2,348,090 | Otto | May 2, 1944 |
| 2,647,965 | Michie | Aug. 4, 1953 |